United States Patent [19]
Dupree, Jr. et al.

[11] Patent Number: 5,142,808
[45] Date of Patent: Sep. 1, 1992

[54] PIVOTABLE CRAYFISH TRAP

[76] Inventors: Aubrey J. Dupree, Jr.; Malcolm J. Dupree, both of P.O. Box 855, Gibson, La. 70356

[21] Appl. No.: 786,716

[22] Filed: Nov. 1, 1991

[51] Int. Cl.$^5$ .............................................. A01K 81/04
[52] U.S. Cl. ........................................ 43/6.5; 43/100; 119/2
[58] Field of Search .................. 43/6.5, 4.5, 100, 102, 43/103, 104, 4; 119/2; 56/8

[56] References Cited

U.S. PATENT DOCUMENTS

| | | | |
|---|---|---|---|
| 1,462,196 | 7/1923 | Dros | 43/6.5 |
| 2,663,117 | 12/1953 | Ederer | 43/100 |
| 3,499,421 | 3/1970 | MacDonald. | |
| 3,638,346 | 2/1972 | Stein. | |
| 3,783,535 | 1/1974 | Hanks | 43/6.5 |
| 4,551,938 | 11/1985 | Sheldon. | |
| 4,554,759 | 11/1985 | Edling. | |
| 4,558,990 | 12/1985 | Roach. | |
| 4,702,676 | 10/1987 | Westfall. | |
| 4,718,192 | 1/1988 | Louk. | |
| 4,819,369 | 4/1989 | Bodker. | |
| 4,831,773 | 5/1989 | Rostrom | 43/100 |
| 4,858,363 | 8/1989 | Smith. | |
| 5,076,007 | 12/1991 | Rhodes | 43/102 |

FOREIGN PATENT DOCUMENTS 0156922 9/1982 Japan ..................................... 43/6.5

Primary Examiner—Richard K. Seidel
Assistant Examiner—James Miner
Attorney, Agent, or Firm—George A. Bode; Michael L. Hoelter

[57] ABSTRACT

This invention pertains to the remote harvesting of crayfish by trapping them within a trap submerged in water and then, when harvesting is desired, by applying a counterweight for pivoting the trap so that the trapped crayfish are passed to a line for flushing the crayfish to a collection tank. This operation is accomplished remotely from the harvester and more than one harvester can be connected to the collection tank.

18 Claims, 4 Drawing Sheets

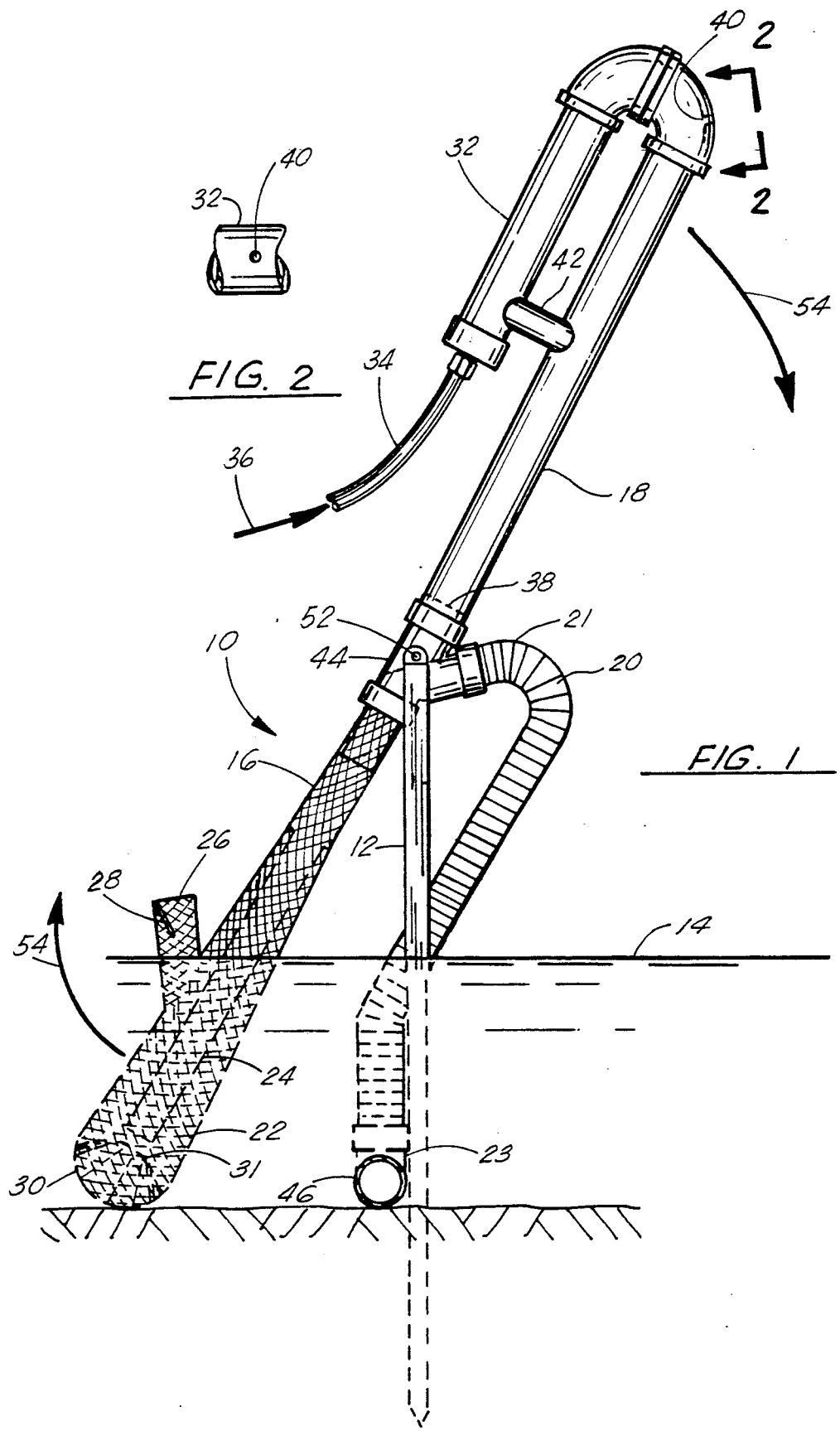

PIVOTABLE CRAYFISH TRAP

BACKGROUND OF THE INVENTION

1. Field of the Invention

This invention pertains to the remote harvesting of crayfish or other crustaceans from shallow ponds, marshes or water. More particularly, it pertains to a harvester that is selectively counterbalanced whenever the retrieval of the trapped crayfish is desired. Such a unit may be operated individually or it may be combined with other similar units for larger harvests.

2. General Background

Crayfish, or as more commonly known—crawfish, is a culinary delicacy that is enjoyed by vast numbers of people. The number consumed per person can vary from a single dozen for small children to dozens for large adults. Thus, to satisfy this demand during the short crayfish season, a need arises to trap or capture as many crayfish as possible as easily and as effortlessly as possible.

Perhaps one of the simplest ways of harvesting caryfish is to tie a string to a piece of bait and drag this bait along the bottom of the pond or marsh being fished. While this method is the least expensive known, it is also extremely labor intensive in view of the relatively small number of crayfish caught. A more common practice is to secure bait to the middle of a waire mesh trap, deposit this trap in the marsh or pond, and then regularly remove the trap and collect its contents. Assuming that many such traps are set, it is conceivable to move from one trap to the next while continuously havesting crayfish.

While more crayfish can be captured this way than the former string method, it is still labor intensive and time consuming. Additionally, these traps must be re-baited frequently because the crayfish will consume the enticing morsel. In simpler traps (those without one-way gates), when the bait is consumed before the crayfish have been harvested, no crayfish will be caught because they will have left for better opportunities elsewhere.

While these methods are suitable in the wild, they are not often practiced with respect to the large scale or commercial harvest of crayfish. In these cases, devices such as those set forth in U.S. Pat. No. 4,554,759 to Edling et al., U.S. Pat. No. 4,819,369 to Bodker, and U.S. Pat. No. 4,858,363 to Smith might be utilized. In each such case, however, a considerable amount of equipment is involved which hinders their usefulness. Additionally, the manpower required to operate the disclosed machinery and harvest the crayfish remains substantial.

What is needed is a simple, yet efficient means for harvesting large numbers of crayfish as quickly as possible with low material and operating costs. A desirable feature would be the ability to harvest such crayfish remotely without the need to actually visit each harvesting site. It is also preferable to harvest crayfish without the need to re-bait the traps as often as is required when using the standard mesh traps.

Another desirable feature is to arrange for the crayfish to be automatically collected within a storage tank without the need to manually collect the crayfish from the various trap locations. It is precisely these features which are found in the present invention. Other features of this invention include an easily operated harvester with essentially no moving parts that can be damaged by exposure to the saline marine environment or by exposure to mud, grit and sand. These and other features of this invention will become obvious upon further investigation.

SUMMARY OF THE PRESENT INVENTION

The preferred embodiment of the apparatus of the present invention solves the aforementioned problems in a straightforward and simple manner. In accordance with this invention, an aquatic harvesting apparatus is disclosed that comprises an elongated harvester that is pivotally mounted upon a support. One end region of this harvester is configured as trap means to trap crayfish while the other end region of this harvester is configured as counterweight means which, when a counterweight is applied, pivots the harvester about the support. The counterweight is selectively applied to and removed from the harvester from a remote location so that the user need not visit the actual harvesting location. Collecting means coupled to the trap means collect and harvest the trapped crayfish when the harvester is counterweighted thereby pivoting the trap means upward.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 1 is a pictorial side view of the preferred embodiment of the apparatus of the present invention positioned in its down or submerged position;

FIG. 2 is a sectional view of the drain outlet taken along lines 2—2 of FIG. 1;

DETAILED DESCRIPTION OF THE PREFERRED EMBODIMENT

Figure 3:
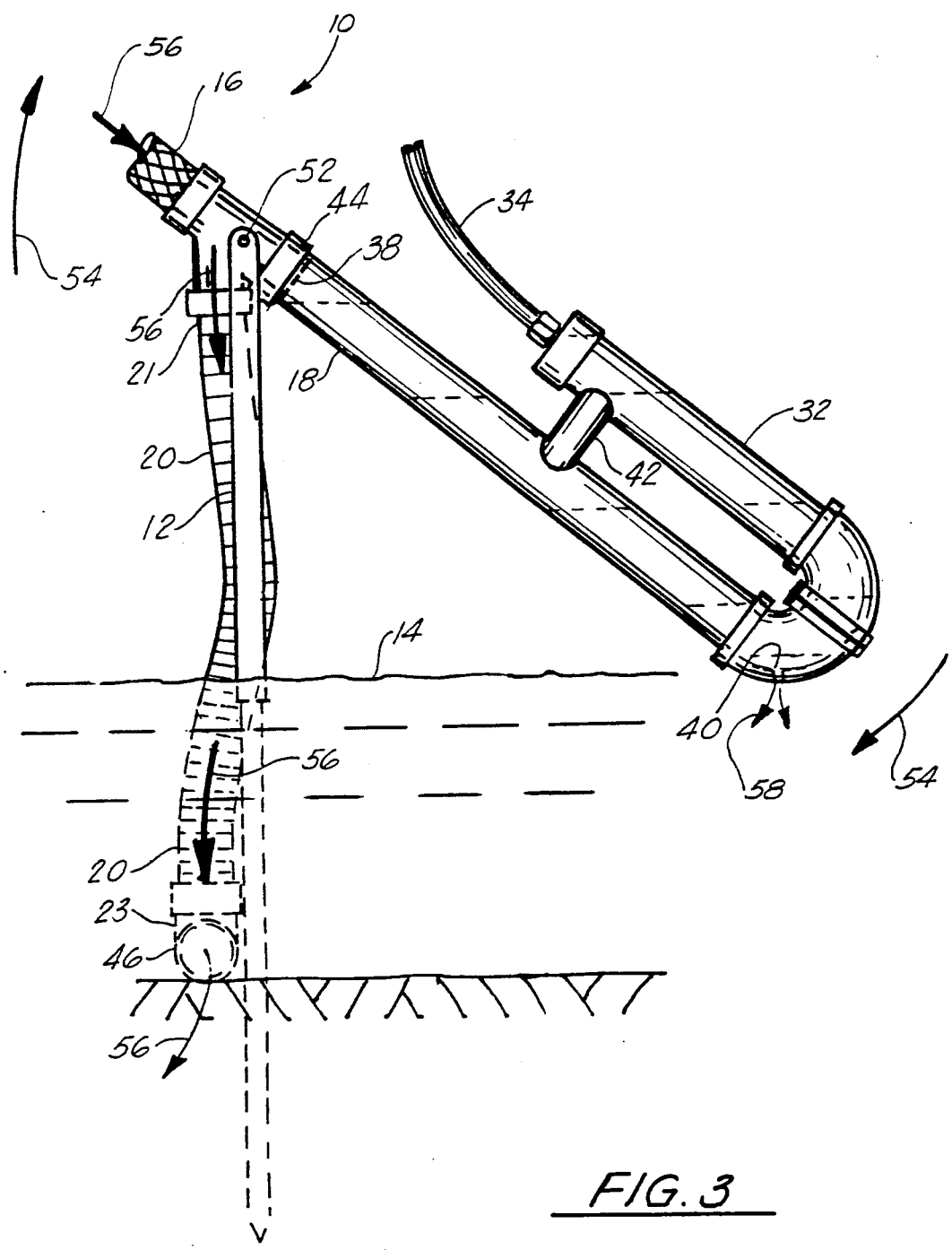
FIG. 3 is a pictorial side view of the preferred embodiment of the invention of FIG. 1 after it has been fully counterbalanced and thus pivoted to its up or harvest position.

Referring initially to FIG. 1, there is shown elongated crayfish harvester 10 pivotally mounted upon upright support 12 which is embedded into the pond or marsh 14 that is to be trapped. Elongated crayfish harvester 10 comprises a trap end region 16 and a counterbalance end region 18 with crayfish harvester 10 being secured to upright support 12 intermediate these end regions 16 and 18. Also intermediate end regions 16 and 18 is flexible hose 20 which is secured to harvester 10 as best shown in FIGS. 1 and 3-6. It is through flexible hose 20 that the harvested crayfish travel on their way to being collected elsewhere or remotely from the fishing sites.

Trap end region 16 of harvester 10 consists of a wire mesh trap 22 that extends nearly the entire length of this region 16. Mesh trap 22 is generally conical in shape becoming larger as it extends away from upright support 12 (or to the distal end of region 16). Braces 24 are incorporated within trap 22 so as to provide support and to maintain the preferred conical shape of trap 22. A bait receptacle 26 is configured as part of trap 22 with this bait receptacle 26 including a hinged cover 28 that retains the bait within receptacle 26 when harvester 10 is pivoted about support 12. Bait receptacle 26 may be in communication with the interior of trap 22, meaning that any bait placed within receptacle 26 will immediately fall inside trap 22, or, in the alternative, bait receptacle 26 may have a solid bottom that retains the bait within the receptacle, thereby preventing it from falling inside trap 22 and being consumed by the trapped crayfish. In this manner, the need to re-bait trap 22 is reduced.

Lower or distal end 30 of trap 22 is also conical or funnel-like in shape as it extends a short distance back up inside trap 22 in the conventional manner with a small opening 31 at its apex through which the crayfish will crawl. It is through this opening 31 in distal end 30 that the crayfish, attracted by the bait, will climb or swim into trap 22. Once inside, the crayfish will be not be able to crawl back outside the funnel opening and thus will become trapped.

Counterbalance end region 18 of harvester 10, in this preferred embodiment, consists of a short section of pipe 32 such as PVC pipe. As shown, this pipe 32 is U or, more accurately, J-shaped so as to provide enough internal volume to counterbalance a full load of crayfish if such becomes necessary. Connected to closed or capped end 33 of pipe 32 is water inlet tubing 34 through which water 36 is supplied from a source (not shown) so as to selectively fill the interior of pipe 32. The control of the flow of water 36 is accomplished remotely from harvester 10 such that the operator need not actually visit each harvester 10 for operation to occur. The opposite end of pipe 32 is blocked or capped by plug 38, located near upright support 12, so as to retain this water 36 within pipe 32.

As best shown in FIG. 2, a small drain opening 40 is incorporated within pipe 32 (there may be more than one drain opening 40 if such is desired) through which water 36 can drain from pipe 32 when harvester 10 is pivoted accordingly. Generally, the size of drain opening 40 is smaller than the size of water inlet tubing 34 so that pipe 32 will fill even should some water be exiting pipe 32 through drain 40. Brace 42 is provided to support the curvature of pipe 32 and, as best shown in FIGS. 1 and 3–6, pipe 32 may incorporate various elbows, end plugs, tees, or other fittings as needed.

Figure 6:
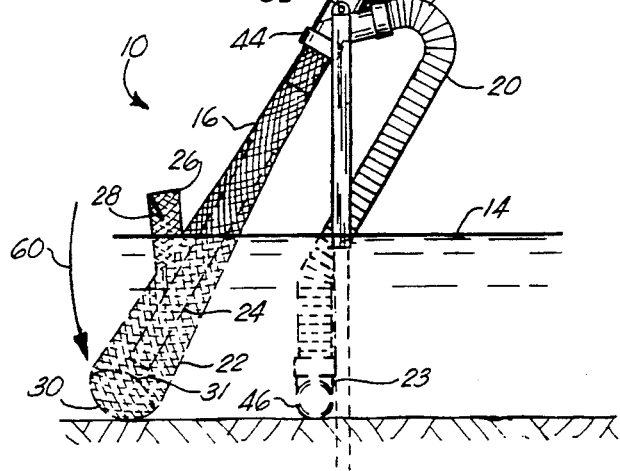
FIG. 6 is a pictorial side view of the preferred embodiment of the invention of FIG. 1 after deballasting has occurred and the invention has pivoted back to the position shown in FIG. 1, ready to start the cycle over again; and, FIG. 7 is a schematic plan view illustrating how a number of individual units can be interconnected and operated from a single, remote location.

As best seen in FIGS. 1, 2 and 6, there is secured to the intermediate region of crayfish harvester 10, between trap end region 16 and counter-balance end region 18, flexible hose 20. In this embodiment, flexible hose 20 is secured to modified or "Y" joint 44. Hose 20 can be constructed of any suitable material so long as it remains flexible during operation and will not "kink." It is also sized so that the crayfish are able to slide within it without jamming. Hose 20 at its proximate end 21 is in direct communication with the interior of trap 22 (and sealed off from communicating with the interior of pipe 32), so that when harvester 10 is pivoted about pin 52 with trap end region 18 swung upward in the clockwise direction of ARROWS 54, the crayfish within trap 22 will be funneled down along trap 22 and into hose 20, as best understood from FIGS. 3–5. Plug 38 prevents any crayfish from sliding into pipe 32 and also channels the crayfish into hose 20.

Figure 7:
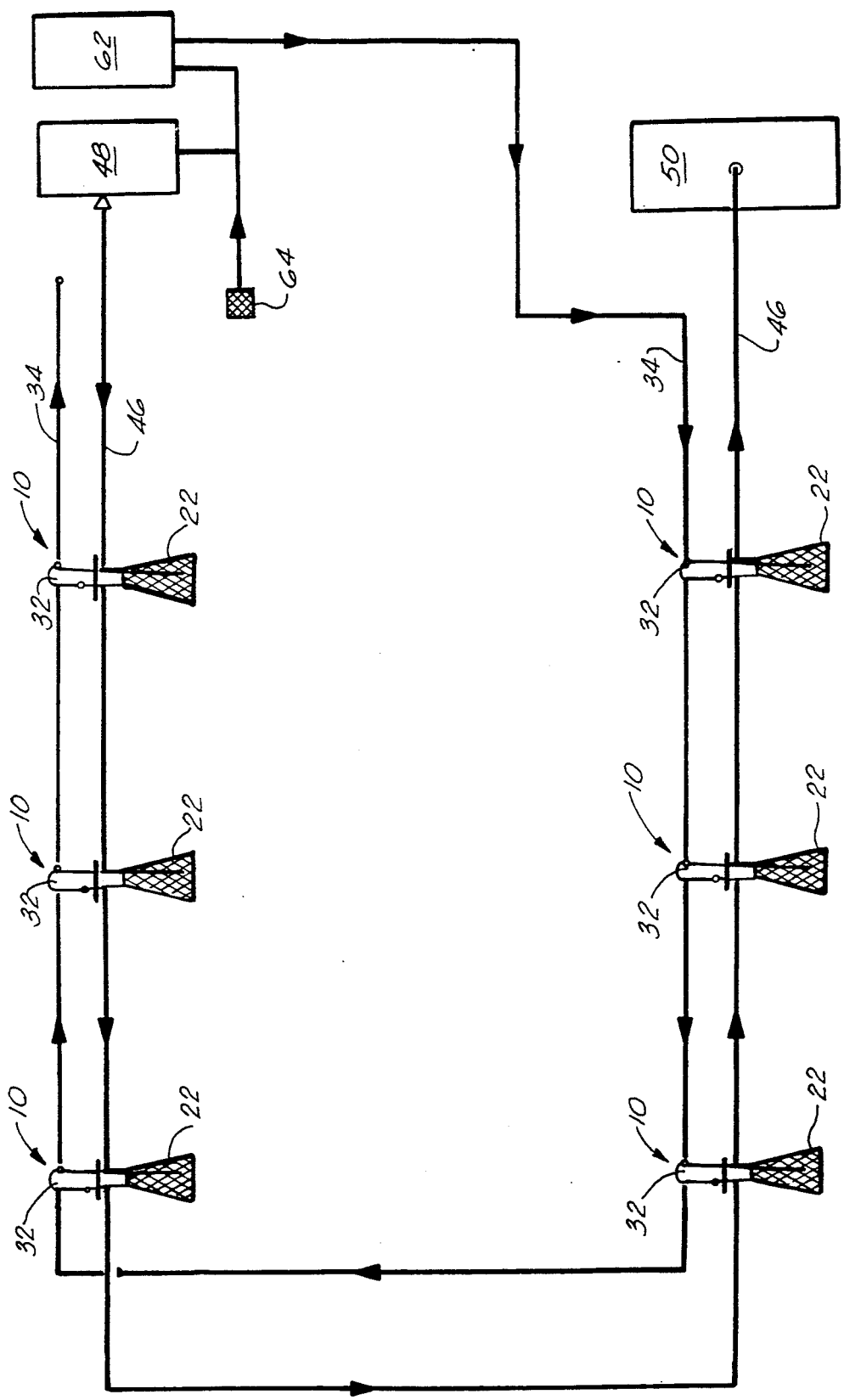

The opposite or distal end 23 of hose 20 is connected to collection pipe 46 which gathers the crayfish from this harvester 10 (and other harvesters if more than one harvester 10 is being used). Generally, a gentle flow of water is pumped through collection pipe 46 via pump 48 (FIG. 7) to flush the crayfish along collection pipe 46 and towards collection tank 50 (FIG. 7). The water pressure within collection pipe 46 is low but there may still be enough of a pressure head for this water to rise up some distance within flexible hose 20, but preferably not enough for this water to spill over and exit "Y" joint 44. Ideally, there will be enough pressure within collection pipe 46 so that the water level will rise about halfway up hose 20 so that when the crayfish are funneled through hose 20, they will slide along hose 20 and into collection pipe 46 easier and with no jamming.

Upright support 12 is best shown is FIGS. 1 and 6 as connecting to "Y" joint 44, thereby supporting harvester 10 above the bottom of marsh or pond 14. In the preferred embodiment a support 12 would be located on opposite sides of harvester 10 with both such supports 12 being connected to harvester 10 via pin 52 about which harvester 10 pivots (in the direction of ARROWS 54 and opposite thereto in the direction of ARROWS 60). In some embodiments, a single pin 52 may extend all the way through "Y" joint 44, but this may cause some jamming problems when the crayfish are to be harvested. Instead, it is preferable for pin 52 not to extend through "Y" joint 44, but to merely secure one support 12 to its respective side of "Y" joint 44 so that there will be no interference with the passing of the crayfish through tee 44.

To initiate operation of harvester 10 (in the position of FIGS. 4 and 5), water 36 flowing through water inlet tubing 34 to pipe 32 is cut off so that any water within counterbalance end region 18 will drain out through drain opening 40. This will casue harvester 10 to pivot in the direction of ARROWS 60 in FIGS. 4 and 5, with trap and region 16 becoming submerged within pond or marsh 14 as best seen in FIG. 6. In this embodiment, harvester 10 is intentionally balanced in this manner so that this result will naturally occur in the absence of any counterbalance. Bait is then placed within bait receptacle 26 making sure hinged cover 28 is not prevented from closing when is should. At this time, no water 36 is being pumped through water inlet tubing 34 to pipe 32, and, it so desired, no water need be pumped through collection pipe 46 as well. As the crayfish become attracted to the bait, they will crawl through the funnel opening 31 in distal end 30 of trap 22, thereby becoming trapped within trap 22. When it is desired to harvest these trapped crayfish, water is remotely pumped through both water inlet tubing 34 and collection pipe 46 so that as water 36 collects within counterbalance end region 18 and fills up pipe 32, its weight will cause harvester 10 to pivot as best shown by ARROWS 54 in FIG. 1.

Referring now to FIG. 3, harvester 10 has been so pivoted by the weight of water 36 within pipe 32. Generally, counterbalance end region 18 will actually become submerged within pond or marsh 14 such that it actually strikes or contacts the mud bottom. This poses no problem since the counterbalance provided by water-filled pipe 32 is more than sufficient to overcome any positive buoyancy that may arise. When thusly pivoted, the crayfish within trap 22 will travel in the direction of ARROWS 56 moving first into hose 20 and then into collection pipe 46. Water 36 will continue to be supplied to water inlet tubing 34 by pump 62 (FIG. 7) until all the crayfish are harvested.

As best illustrated in FIG. 7, the control of the flow of water 36 through both tubing 34 and collection pipe 46 is accomplished independently and remotely from harvester 10 by pumps 62, and 48, respectively. It should also be noted that the water 36 being supplied to counterbalance end region 18 via tubing 34 is simultaneously being drained (ARROWS 58) from pipe 32 via drain opening 40. As stated earlier, water 36 is supplied pipe 32 at a faster rate than it can drain due to the difference in the inlet and exit openings so that counterbalance end region 18 will fill up and remain filled as long as needed.

Figure 4:
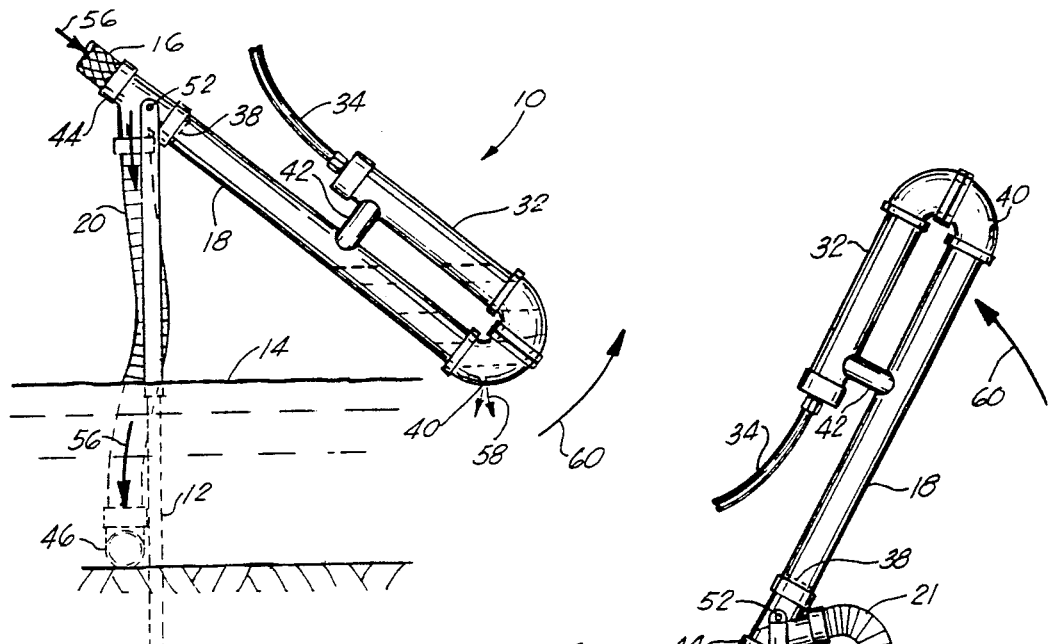
FIG. 4 is a pictorial side view of the preferred embodiment of the invention of FIG. 1 while it is in a deballasting state.
Figure 5:
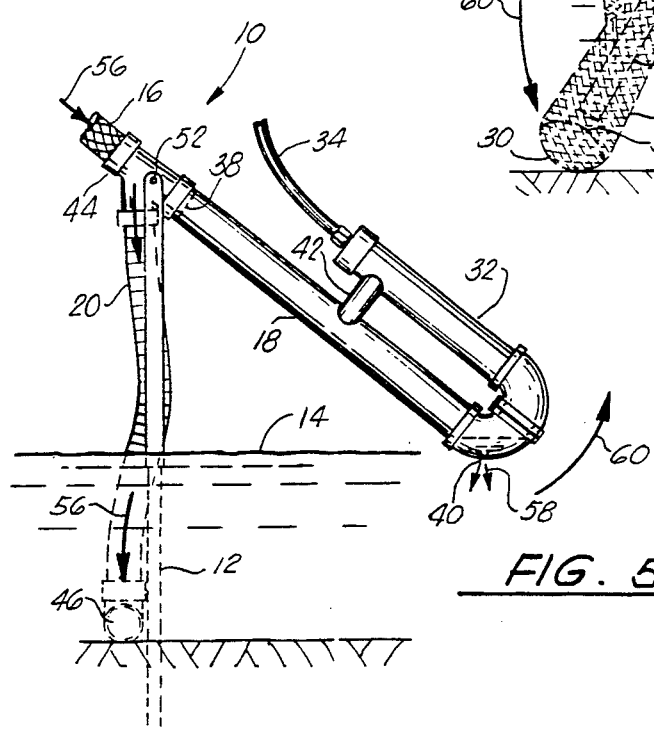
FIG. 5 is a pictorial side view of the preferred embodiment of the invention of FIG. 1 near the completion of its deballasting cycle and just before it pivots back to its original submerged position.

Referring now to FIGS. 4 and 5, when nearly all the crayfish are harvested, no more water 36 need be supplied water inlet tubing 34 and, therefore, pump 62 can be deactivated (or a value in tubing 34 can be supplied and closed). This enables the water 36 within pipe 32 to drain via drain opening 40 as shown by ARROWS 58. As a sufficient quantity of water 36 drains, harvester 10 will begin to pivot in the counter-clockwise direction (see ARROWS 60) so that empty counterbalance end region 18 will once again extend upward and trap end region 16 will once again become submerged within pond or marsh 14 (the position of FIGS. 1 and 6). Thus the entire cycle can be repeated as many times as is desired by simply supplying and then cutting off the supply of water 36 to counterbalance end region 18. Should counterbalance end region 18 become stuck in the mud, there is sufficient head or pressure within pipe 32 to still permit water 36 to drain so that a positive buoyancy will occur, thereby preventing harvester 10 from remaining stuck for long.

Referring now to FIG. 7, there is shown collection pipe 46 that collects and transports the crayfish from the various harvesters 10 to a collection tank 50. Collection pipe 46 is sized such that the large number or crayfish collected will freely move along pipe 46 the crayfish can be properly flushed through this system. Also shown in FIG. 7 is pump 62 that pumps water 36 through water inlet tubing 34. While two such pumps 48 and 62 are shown, it is conceivable to operate harvesters 10 with only one pump and a means for regulating the flow through tubing 34 and pipe 46. It is through tubing 34 connected to each harvester 10 that the counterbalancing force or weight is provided as needed. Control 64, as shown, remotely operates both pump 48 and pump 62 and their output so that the operator need not visit each harvester 10 to collect and harvest the crayfish. As started earlier, when the crayfish are to be harvested, water is pumped through both tubing 34 and pipe 46 as needed and when harvesting is completed, the flow of water through tubing 34 and pipe 46 is stopped via control 64.

While FIG. 7 indicates that there can be a number of harvesters 10 connected in series, it is equally possible to utilize only one harvester if such is desired. In this case, there may be no need to incorporate a pump to cause water to flow through tubing 34 and pipe 46.

It should also be recognized that the control and operation of harvesters 10 is accomplished remotely via control 64, i.e. the operator need not manually apply or remove the counterweight to each of the harvesters 10. Instead, the operator will merely control the flow of water 36 through water inlet tubing 34, thereby either filling pipe 32 or draining pipe 32 which will cause trap end region 16 to automatically pivot to either the submerged position (of FIGS. 1 and 6) or to the harvesting positions (FIGS. 3, 4 and 5). Additionally, control 64 will regulate the pressure within collection pipe 46. The control of water to each of the various harvesters will generally occur from a single location near collection tank 50 and/or pump 48 and pump 62 so that the operator need not actually visit each of the harvesters 10 to retrieve his catch.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An aquatic harvesting apparatus comprising:
   (a) an elongated harvesting member pivotally mounted upon a support member between opposing end regions of said harvesting member;
   (b) trap means secured to one end region of said harvesting member for trapping aquatic life, said trap means comprising a conically-shaped wire mesh trap having a funnel means at one end with an opening therein through which said aquatic life may pass;
   (c) counterweight means secured to the opposite end region of said harvesting member for selectively applying a counterweight to and removing a counterweight from said opposite end region of said harvesting member so as to selectively pivot said trap means about said support member between a first harvesting position and a second trap-emptying position;
   (d) collecting means in communication with said trap means for collecting said trapped aquatic life when said counterweight is applied to said opposite end region of said harvesting member, thereby pivoting said trap means from its said first to said second position and,
   (e) means for selectively controlling the application and removal of said counterweight.

2. The harvesting apparatus as set forth in claim 1, wherein said collecting means includes a collection tank into which said trapped aquatic life are collected.

3. The harvesting apparatus as set forth in claim 2, wherein said collecting means further includes a conduit in communication with said trap means, said conduit sized to collect and pass said trapped aquatic life therethrough.

4. The harvesting apparatus as set forth in claim 3, wherein said conduit communicates with collection pipe means for collecting said trapped aquatic life and delivering the same to said collection tank.

5. The harvesting apparatus as set forth in claim 4, further comprising a plurality of said harvesting members in communication via said collection pipe means.

6. The harvesting apparatus as set forth in claim 5, further comprising pump means for flushing said trapped aquatic life through said collection pipe means and into said collection tank.

7. The harvesting apparatus as set forth in claim 1, wherein said trap means further comprises means for inserting and retaining bait within said trap means.

8. The harvesting apparatus as set forth in claim 1, wherein said counterweight is selectively applied to said opposite end region of said harvesting member to pivot said trap means from its said first to said second position and wherein said counterweight is selectively removed from said harvester to pivot said trap means from its said second position to said first position.

9. The harvesting apparatus as set forth in claim 8, wherein ssaid counterweight means comprises a hollow pipe selectively filled with a fluid when said trap means is to be pivoted from said first to said second position and wherein said pipe is selectively drained of said fluid when said trap means is to be pivoted from said second to said first position.

10. An aquatic harvesting method comprising the steps of:
  (a) pivotally mounting an elongated harvesting member upon a support member intermediate opposite end regions of said harvesting member;
  (b) submerging below lthe water line of an aquatic source one end region of said harvesting member, said one end region comprising trap means for trapping aquatic life, said trap means comprising a conically-shaped wire mesh trap having a funnel means at one end with an opening therein through which said aquatic life passes;
  (c) selectively controlling a counterweight attached to the opposite end region of said harvesting member so as to pivot said trap means about said support member from a first harvesting position to a second trap-emptying position; and,
  (d) collecting any trapped aquatic life from said trap means when said trap means is selectively pivoted from a first harvesting position to said second trap-emptying position.

11. The harvesting method as set forth in claim 10, further comprising the step of delivering said trapped aquatic life to a collection tank.

12. The harvesting method as set forth in claim 11, further comprising the step of removing said counterweight from said opposite end region to pivot said trap means from said second to said first position.

13. The harvesting method as set forth in claim 10, further comprising the step of providing bait retaining means within said trap means.

14. The harvesting method as set forth in claim 13, wherein said counterweight comprises a hollow pipe selectively filled with a fluid when said trap means is to be pivoted from said first to said second position and wherein said pipe is selectively drained of said fluid when said trap means is to be pivoted from said second to said first position.

15. The harvesting method as set forth in claim 14, wherein a collection tank is provided, said collection tank including a conduit in communication with said trap means, said conduit sized to collect and pass said trapped aquatic life therethrough.

16. The harvesting method as set forth in claim 15, wherein said conduit is coupled to collection pipe means for collecting said trapped aquatic life and for delivering the same to said collection tank.

17. The harvesting method as set forth in claim 16, further comprising the step of connecting a plurality of said harvesting members via said collection pipe means.

18. The harvesting method as set forth in claim 17, further comprising the step of flushing said trapped aquatic life through said collection pipe means and into said collection tank.

* * * * *